TEMPERATURE MEASUREMENTS
Filed Aug. 19, 1966 2 Sheets-Sheet 1
Fig. 1
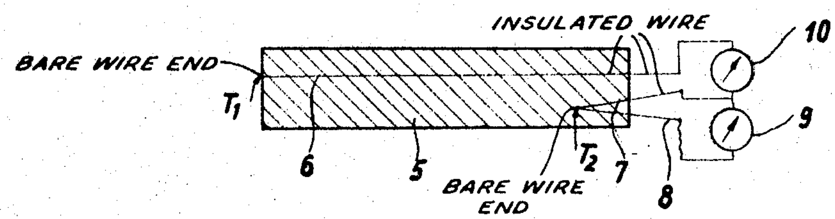
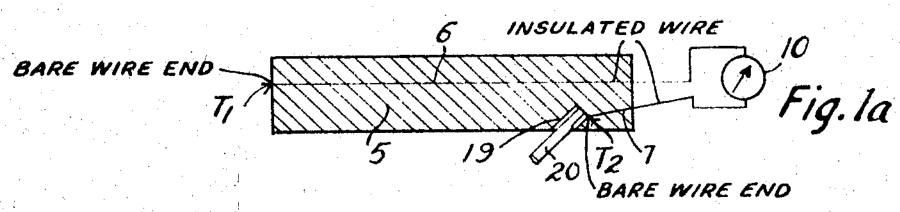
Fig. 1a
Fig. 2
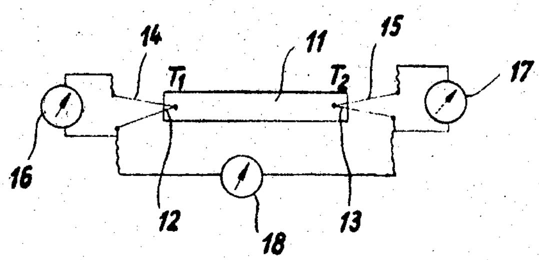

July 29, 1969 W. A. FISCHER 3,457,785

TEMPERATURE MEASUREMENTS

Filed Aug. 19, 1966 2 Sheets-Sheet 2

3,457,785

TEMPERATURE MEASUREMENTS

Wilhelm Anton Fischer, Ratingen, Germany, assignor to Gesellschaft zur Forderung der Eisenhuttentechnik m.b.H., Dusseldorf, Germany Filed Aug. 19, 1966, Ser. No. 573,559
Claims priority, application Germany, Aug. 24, 1964, G 44,507
Int. Cl. G01k 5/18
U.S. Cl. 73—359 8 Claims

ABSTRACT OF THE DISCLOSURE

Method and apparatus for measuring the temperature of molten metal, such as a metal of iron or steel, which includes providing a semiconducting body of known thermoelectric temperature coefficient and having two metal electrodes embedded in the body, contacting a first one of the electrodes with the molten material whose temperature is to be measured, simutaneously measuring the temperature of the second electrode, measuring the generated voltage between the two electrodes and calculating the temperature of the material from the measured data.

Figure 3:
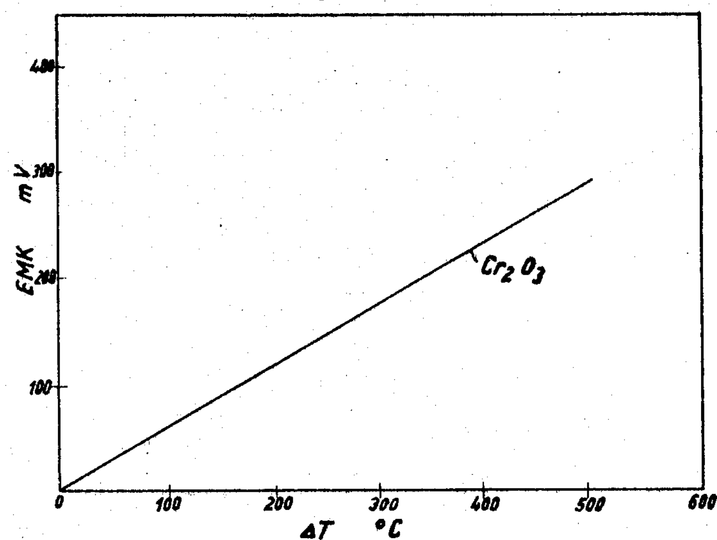

This invention relates to the measurement of temperature, for example the measurement of high temperature in industrial metallurgy such as steel making and fusion metallurgy, and is based on the phenomenon that in semiconductors in the presence of a temperature gradient, an electromotive force (EMF), the so called thermoelectric force, is generated.

For example, if a bar of sintered chromium oxide with metallic electrodes inserted in its ends is heated in a furnace in such a way that the temperature of one end of the bar is 1300° C. while the temperature at the other end of the bar is 1800° C., the electrometer measurements across the electrodes show an EMF of 305 mv. arising from the 500° C. difference in temperature. If the same temperature prevails at both ends of the bar, then the thermoelectric voltage is zero while in a given range of temperature it rises linearly with the increase in difference in temperature between the two bar ends, i.e. the temperature coefficient EMF/° C. is constant and, in the above example, amounts to 0.61 mv.° C. The temperature coefficient for any semiconductor may likewise be determined.

With excess conductors, the so called n-conductors, the electrode which is hotter at a given time is positive while in defect conductors, the so called p-conductors, the hotter electrode is negative since the electrons always migrate from regions of higher concentration to regions of lower concentration.

We use this phenomenon, in accordance with the invention, to control a manufacturing process involving measuring the temperature of a material being used in a process, wherein the temperature measurement is carried out by providing a semiconducting element of known thermoelectric temperature coefficient and having two metal electrodes embedded in the element, causing a first one of the electrodes to remain in contact with the material, the temperature ($T_1$) of which is to be measured, whilst the second electrode is at a known temperature ($T_2$) different from that of the material, measuring the induced voltage between the two electrodes and calculating the temperature of the material from the known and measured factors.

The semiconducting element must be an excess conductor (n-conductor) or a defect conductor (p-conductor) since intrinsic semiconductors produce no thermoelectric force in so far as the mobility of the electrons and holes is equally large. Lack of stoichiometry always causes excess or defect conduction. Intrinsic semiconductors on the other hand are always stoichiometrically composed but they may be made into excess or defect semiconductors, by the addition of oxides, for example.

Whether the addition of oxides to an intrinsic semiconductor produces a defect or an excess conductor depends on the valency of the added oxide. Thus, for example, defect electrons are produced with chromic or aluminium oxide by the small addition of a divalent oxide such as magnesium oxide while the addition of a tetravalent oxide such as titanium dioxide produces excess electrons. Apart from those mentioned, a series of other semiconductors may be used, e.g., oxidic compounds of the 2–3 and 4–2 spinel types such as $MgO \cdot Al_2O_3$, $ZnO \cdot Al_2O_3$, $MgO \cdot Gr_2O_3$, $NiO \cdot Cr_2O_3$, $CdO \cdot Cr_2O_3$, and $2MgO \cdot TiO_2$, $2CaO \cdot TiO_2$. Since the conductivity of the intrinsic oxidic semiconductors is independent of the oxygen partial pressure, the conductivity decreases with oxidic n-conductors with the oxygen partial pressure while with oxidic p-conductors the conductivity increases and thus it is the first type of semiconductor which is preferred when the electrodes are exposed to different oxygen partial pressures. In fact with the spinel $MgO \cdot Cr_2O_3$ it has been found that its thermoelectric force of 0.61 mv./° C. remains substantially unchanged when there is a difference in oxygen partial pressure between the electrodes of up to a factor of $10^5$ i.e. when the colder electrode is at 1 atmosphere and the hotter electrode is at $10^{-5}$ atmospheres, for example.

The reference temperature $T_2$ of the second electrode which will be the colder electrode when high temperatures are to be measured, may be determined both thermoelectrically or optically. This measurement may be completely omitted if the temperature of the second electrode is held constant at the known temperature $T_2$. Among the semiconductors which may be used according to the invention special preference is given to materials which have a specific resistance of between $10^{10}$ and $10^{12}$ ohm cm. in the temperature range between the reference temperature $T_2$ and the temperature to be measured $T_1$. Since, for example, silicon doped with 1% boron is a defect conductor which has a specific resistance of about $10^4$ in the temperature range 200° C. to −200° C., an element of such material may be used to measure not only high temperatures but also low temperatures.

The invention also includes a device for measuring temperature in accordance with the invention, the device comprising an element in the form of sintered body of semiconducting material in which first and second metallic conductors are embedded, the first electrode extending to an end of the element where it is arranged to be brought into contact with the material, the temperature of which is to be measured, and the second electrode terminating a distance from this end of the element, the two electrodes being connected to a voltmeter which is arranged in use to indicate the induced voltage between the electrodes.

If the temperature $T_2$ of the second electrode is to be measured, it may also form one arm of a thermoelectric element embedded in the sintered body, the thermoelectric element being connected to a millivoltmeter which is arranged in use to indicate a voltage corresponding to the temperature of the second electrode. However instead of using a thermoelectric element to measure $T_2$ electrically, the sintered body may have a boring extending into the vicinity of the second electrode for receiving a pyrometer whereby the temperature of the second electrode can be determined optically.

Figure 4:
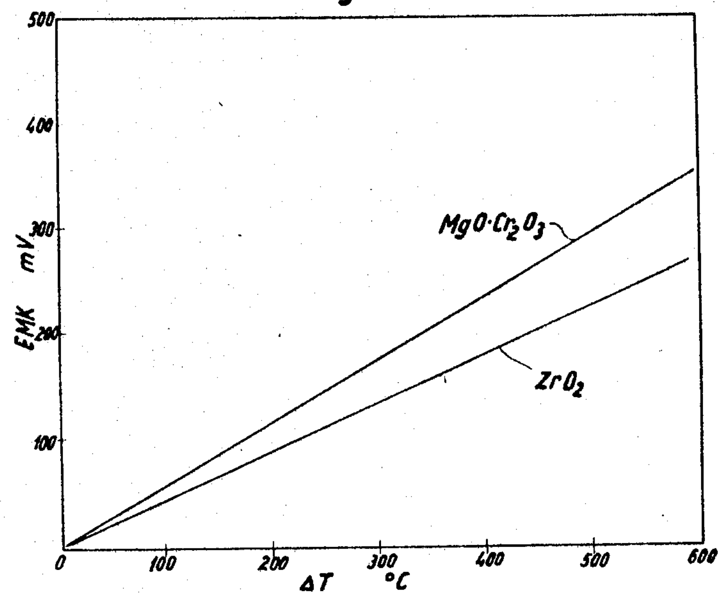

One example of a device for measuring temperature in accordance with the invention is illustrated in the accompanying drawings, in which:

FIGURE 1 shows a device for the measurement of higher than ambient temperature;

FIGURE 1*a* shows a modified embodiment of the device of FIG. 1;

FIGURE 2 shows a device for determining the thermoelectric temperature coefficient of the semiconducting material from which the body of the device is made; and, FIGURES 3 and 4 show the variation of EMF with the temperature between hotter and colder electrodes for various semiconductors.

The device shown in FIGURE 1 has a bar-shaped sintered body 5 made of a semiconducting material and two insulated metallic conductors 6 and 7 embedded in it, one of which extends to the front end of the sintered body 5 and forms the hotter first electrode at the extreme bare end thereof while the other metallic conductor extends only to a distance from it and forms the colder second reference electrode. The colder electrode 7 simultaneously forms one insulated arm of a thermoelectric element and a millivoltmeter 9 is connected between this arm and another insulated arm 8. The insulated arms 7 and 8 meet at a bare end point within the body 5. A tube voltmeter 10 is connected between the two electrodes 6 and 7 for the electrometric measurement of the EMF. As shown in FIG. 1*a*, instead of the other arm 8 of the thermoelectric element and the millivoltmeter 9 for measuring temperature $T_2$ electrically, a bore 19 is formed in the semiconductor body 5 and extends into the vicinity of the electrode 7, and a diagrammatically shown pyrometer 20 is received in the bore 19 for determining the temperature $T_2$ of the electrode 7 optically.

The device shown in FIGURE 2 consists of means for measuring the temperature coefficient EMF/° C. and includes a bar-shaped semiconductor 11 in which two electrodes 12 and 13 similar to the electrodes 7, 8 are embedded at a distance from each other which together with the arms 14 and 15 and two millivoltmeters 16 and 17 each form a thermoelectric element. The two electrodes 12, 13 are joined through a tube voltmeter 18 for the electrometric measurement of the EMF.

If at one end of the bar 11 there is a temperature $T_1$ and there is a temperature $T_2$ at the other end of the bar, where $T_1$ is greater than $T_2$, then there is a potential difference which is measured by means of the tube voltmeter 18 and the value of which depends on the difference in temperature ($T_1$–$T_2$) between the electrode 12 and the electrode 13.

By changing $T_1$ and/or $T_2$ it is possible to measure the EMF corresponding to each difference in temperature. If for chromic oxide, the measured thermoelectric force is plotted against the temperature difference $\Delta T$, that is $T_1$–$T_2$, on a coordinate system, then a straight line is obtained as in FIGURE 3. Similar diagrams may be drawn using the device according to FIGURE 2, for example for stabilised zirconium oxide and the spinel $MgO \cdot Cr_2O_3$ (FIGURE 4). If the variation of the thermoelectric force with the temperature difference is a linear function, then the temperature coefficient EMF/° C. is a constant and thus may be determined directly from the measurements obtained. With a constant temperature coefficient, the temperature of the measuring chamber or of the medium is given by the equation:

$$T_1 = T_2 + \frac{EMF_{meas.}}{EMF/°\,C.}$$

When the device shown in FIGURE 1 is used, the temperature $T_2$ may be read off from the millivoltmeter 9 and the induced thermoelectric force $EMF_{meas.}$ from the tube voltmeter 10 while the temperature coefficient EMF/° C. is known from the corresponding measurement curves (cf. FIGURES 3, and 4). When there is no linear relationship between the temperature difference $\Delta T$ and the thermoelectric force, the temperature to be measured is given by the equation $$T_1 = T_2 + \Delta T$$

The temperature $T_2$ of the colder electrode is read off from the millivoltmeter 9 while the value $\Delta T$ is read off from the diagrams for the semiconductor concerned in FIGURES 3 and 4 using the EMF value from the tube voltmeter 10.

With a device corresponding to that in FIGURE 1, the temperature of the interior of a Tammann furnace lined with a corundum tube was measured. For this there was inserted into the furnace interior a measuring bar of sintered, stabilised zirconium dioxide into which a continuous metallic conductor of Pt-Rh wire (hotter electrode) had been sintered while in a boring a Pt-Rh-18 thermoelement was introduced to reach the bottom of the boring. A millivolt meter was connected between the arms of the thermoelement and a tube voltmeter was connected between the two electrodes. In this way a thermoelectric force (EMF) of 392 mv. was measured between the continuous conductor (hot electrode) and the arm consisting of the same alloy (colder electrode) while a reference temperature of 930° C. was read off the millivoltmeter 9 ($T_2$). The temperature coefficient EMF/° C. of the stabilised zirconium oxide had previously been determined as 0.45 mv./° C. On the basis of the equation given above the furnace temperature could be calculated directly and was found to be $$T_1 = 930 + \frac{392}{0.45}$$

$$= 930 + 870$$

$$= 1800°\,C.$$

Comparison measurements of the furnace temperature $T_1$ with a thermoelement gave a difference of ±5° C. from agreement with the value for the temperature $T_1$ determined by the process according to the invention.

In another experiment, a measuring bar made of the spinel $MgO \cdot Cr_2O_3$ and fitted as in FIGURE 1 with two electrodes and a thermoelement was dipped into a mild steel melt. The reference temperature in this case was 1200° C. and the EMF read from the tube voltmeter 10 was 287 mv. so that the temperature of the melt $T_1$ was found to be 1670° C. using the previously determined temperature coefficient 0.61 mv./° C. for the spinel. Comparative measurement with an immersion thermoelement showed a temperature agreeing with the calculated value by an error of ±5° C.

The process according to the invention is particularly well suited to the measurement of very high temperatures using very refractory semiconductors on an oxidic basis. It is particularly suited to a high degree to the continuous measurement of the temperature of metal melts, especially iron and steel melts, where the front end of the measuring bar with the hotter electrode is immersed in the melt so that the temperature change of the whole melt may be followed through the whole of a process stage. Even if part of the bar melts, the temperature measurement according to the invention does not suffer since the thermoelectric force is independent of the length of the electrodes and their spacing.

I claim:

1. A method of measuring the temperature of molten metal, such as a melt of iron or steel, which comprises providing a semiconducting body of known thermoelectric temperature coefficient and having two metal electrodes embedded in the body, contacting a first one of the electrodes with the molten material whose temperature ($T_1$) is to be measured, simultaneously holding the second electrode at a known temperature ($T_2$) different from that of the material, measuring the generated voltage between the two electrodes and calculating the temperature of the material from the known and measured data.

2. A method according to claim 1, in which the known temperature ($T_2$) of the second electrode is measured thermoelectrically.

3. A method according to claim 1, in which the known temperature ($T_2$) of the second electrode is measured optically.

4. A method according to claim 1, in which the semiconducting material from which the body is made has a specific resistance between $10^{10}$ and $10^{12}$ ohm cm. in the temperature range between ($T_1$) and ($T_2$).

5. A device for measuring the temperature of molten metal, such as a metal of iron or steel, comprising a body of semiconducting material having a known theromelectric temperature coefficient, first and second metallic conductors embedded in said body, said first electrode extending to an end of the body where said first electrode is arranged to be brought into contact with the molten material whose temperature is to be measured, said second electrode terminating a distance from said end of said body, and voltage measuring means connected between said two electrodes for measuring the votlage generated between said electrodes.

6. In a device according to claim 5, said semiconducting body being formed of sintered material and having elongated shape, said second conductor being embedded in said body at the other end thereof.

7. In a device according to claim 6, said second electrode forming one leg of a thermoelectric couple embedded in said sintered body, and a millivoltmeter connected to said thermoelectric couple to indicate a voltage corresponding to the temperature of said second electrode.

8. In a device according to claim 6, said sintered body having a bore extending into the vicinity of said second electrode for receiving a pyrometer whereby the temperature of the second electrode can be determined optically.

References Cited

UNITED STATES PATENTS

| | | | |
|---|---|---|---|
| 885,430 | 4/1908 | Bristol | 136—234 X |
| 2,407,678 | 9/1946 | Ohl | 73—359 X |
| 3,307,401 | 3/1967 | Bachman | 73—359 |

LOUIS R. PRINCE, Primary Examiner

F. SHOON, Assistant Examiner

U.S. Cl. X.R.

73—361; 136—234

UNITED STATES PATENT OFFICE

CERTIFICATE OF CORRECTION

Patent No. 3,457,785 July 29, 1969

Wilhelm Anton Fischer

It is certified that error appears in the above identified patent and that said Letters Patent are hereby corrected as shown below:

In the heading to the printed specification, line 7, "August 24, 1964" should read -- August 24, 1965 --.

Signed and sealed this 10th day of February 1970.

(SEAL)
Attest:

Edward M. Fletcher, Jr.
Attesting Officer

WILLIAM E. SCHUYLER, JR.
Commissioner of Patents